(12) United States Patent
Stich et al.

(10) Patent No.: US 12,523,727 B2
(45) Date of Patent: Jan. 13, 2026

(54) REDUCING AND CORRECTING MAGNETIC FIELD GRADIENT DEVIATIONS

(71) Applicant: Siemens Healthcare GmbH, Erlangen (DE)

(72) Inventors: Manuel Stich, Parkstein (DE); Philipp Puls, Erlangen (DE)

(73) Assignee: Siemens Healthineers AG, Forchheim (DE)

( * ) Notice: Subject to any disclaimer, the term of this patent is extended or adjusted under 35 U.S.C. 154(b) by 310 days.

(21) Appl. No.: 18/141,600

(22) Filed: May 1, 2023

(65) Prior Publication Data

US 2023/0358839 A1 Nov. 9, 2023

(30) Foreign Application Priority Data

May 3, 2022 (DE) ..................... 10 2022 204 340.5

(51) Int. Cl.
*G01R 33/565* (2006.01)
*G01R 33/385* (2006.01)
*G06N 20/00* (2019.01)

(52) U.S. Cl.
CPC ... *G01R 33/56572* (2013.01); *G01R 33/3852* (2013.01); *G06N 20/00* (2019.01)

(58) Field of Classification Search
CPC .......... G01R 33/3852; G01R 33/56572; G06N 20/00
See application file for complete search history.

(56) References Cited

U.S. PATENT DOCUMENTS 8,228,064 B2 * 7/2012 Schaefer ............ G01R 33/3852
324/309
10,545,211 B2 * 1/2020 Harris ............... G01R 33/56572
(Continued)

FOREIGN PATENT DOCUMENTS

DE 102020209787 A1 2/2022

OTHER PUBLICATIONS

Campbell-Washburn, Adrienne E., et al. "Real-time distortion correction of spiral and echo planar images using the gradient system impulse response function." Magnetic resonance in medicine 75.6 (2016): 2278-2285.

(Continued)

*Primary Examiner* — Gregory H Curran
(74) *Attorney, Agent, or Firm* — Lempia Summerfield Katz LLC

(57) ABSTRACT

A deviation from a target gradient of a magnetic field gradient created by an MR system is reduced or corrected. The MR system includes an amplifier, which amplifies an amplifier input signal and outputs an amplifier output signal, and a gradient coil, which creates the magnetic field gradient with the aid of the amplifier output signal. Input data is provided for a trained function trained by a machine-learning algorithm. The input data includes information about the target gradient of the MR system. Output data is created by the trained function with the aid of the input data. A gradient characterization function of the gradient coil is determined. The deviation from the target gradient of the magnetic field gradient created by the MR system is reduced and/or corrected. A deviation caused by the amplifier is reduced and/or corrected with the aid of the output data created, and a deviation caused by the gradient coil is reduced and/or corrected with the aid of the gradient characterization function.

18 Claims, 7 Drawing Sheets

(56) References Cited

U.S. PATENT DOCUMENTS

| | | | |
|---|---|---|---|
| 11,408,952 B2* | 8/2022 | Gong | G01R 33/543 |
| 2020/0333410 A1 | 10/2020 | Ruyters et al. | |
| 2021/0106251 A1* | 4/2021 | Lips | H03F 1/3241 |
| 2022/0043090 A1 | 2/2022 | Stich et al. | |
| 2022/0043092 A1 | 2/2022 | Stich et al. | |
| 2022/0043093 A1 | 2/2022 | Stich et al. | |
| 2023/0086826 A1 | 3/2023 | Stich et al. | |
| 2023/0358834 A1 | 11/2023 | Stich | |

OTHER PUBLICATIONS

Clayton, David B., et al. "1H spectroscopy without solvent suppression: characterization of signal modulations at short echo times." Journal of magnetic resonance 153.2 (2001): 203-209.

Dietrich, Benjamin E., et al. "A field camera for MR sequence monitoring and system analysis." Magnetic resonance in medicine 75.4 (2016): 1831-1840.

Dietrich, Benjamin Emanuel, et al. "Thermal variation and temperature-based prediction of gradient response." Proc Int Soc Magn Reson Med Sci Meet Exhib 25 (2017): 0079.

Duyn, Jeff H., et al. "Simple correction method for k-space trajectory deviations in MRI." Journal of Magnetic Resonance 132.1 (1998): 150-153.

Feng, Xiaowen. Efficient baseband digital predistortion techniques for linearizing power amplifier by taking into account nonlinear memory effect. Diss. université de Nantes, 2015. pp. 1-143.

Foerster, Bernd U., Dardo Tomasi, and Elisabeth C. Caparelli. "Magnetic field shift due to mechanical vibration in functional magnetic resonance imaging." Magnetic Resonance in Medicine: An Official Journal of the International Society for Magnetic Resonance in Medicine 54.5 (2005): 1261-1267.

Jehenson, P., M. Westphal, and N. Schuff. "Analytical method for the compensation of eddy-current effects induced by pulsed magnetic field gradients in NMR systems." Journal of Magnetic Resonance (1969) 90.2 (1990): 264-278.

Nussbaum, Jennifer, et al. "Nonlinearity and thermal effects in gradient chains: a cascade analysis based on current and field sensing." Proceedings of the 27th Annual Meeting of ISMRM. Montreal, Canada. 2019.

Peters, Dana C., et al. "Undersampled projection reconstruction applied to MR angiography." Magnetic Resonance in Medicine: An Official Journal of the International Society for Magnetic Resonance in Medicine 43.1 (2000): 91-101.

Rahmer, Jürgen, et al. "Non-Cartesian k-space trajectory calculation based on concurrent reading of the gradient amplifiers' output currents." Magnetic Resonance in Medicine 85.6 (2021): 3060-3070.

Rahmer, Jürgen, et al. "Rapid acquisition of the 3D MRI gradient impulse response function using a simple phantom measurement." Magnetic resonance in medicine 82.6 (2019): 2146-2159.

Richard, Alexander, Peter Dodds, and Vamsi Krishna Ithapu. "Deep impulse responses: Estimating and parameterizing filters with deep networks." In ICASSP 2022-2022 IEEE International Conference on Acoustics, Speech and Signal Processing (ICASSP), pp. 3209-3213. IEEE, 2022.

Stich, Manuel, et al. "Gradient waveform pre-emphasis based on the gradient system transfer function." Magnetic resonance in medicine 80.4 (2018): 1521-1532.

Stich, Manuel, et al. "The temperature dependence of gradient system response characteristics." Magnetic Resonance In Medicine 83.4 (2020): 1519-1527.

Vannesjo, Signe J., et al. "Gradient system characterization by impulse response measurements with a dynamic field camera." Magnetic resonance in medicine 69.2 (2013): 583-593.

Wang, Zhenyu, et al. "Deep neural nets based power amplifier non-linear pre-distortion." Journal of Physics: Conference Series. vol. 887. No. 1. IOP Publishing, 2017.

Wech, Tobias, et al. "Using self-consistency for an iterative trajectory adjustment (SCITA)." Magnetic resonance in medicine 73.3 (2015): 1151-1157.

Wu, Yibo, et al. "Residual neural networks for digital predistortion." GLOBECOM 2020-2020 IEEE Global Communications Conference. IEEE, 2020.

Wu, Yuhua, et al. "Gradient-induced acoustic and magnetic field fluctuations in a 4T whole-body MR imager." Magnetic resonance in medicine 44.4 (2000): 532-536.

* cited by examiner

REDUCING AND CORRECTING MAGNETIC FIELD GRADIENT DEVIATIONS

RELATED APPLICATION

This application claims the benefit of German Application DE 10 2022 204 340.5, filed on May 3, 2022, which is hereby incorporated by reference in its entirety.

FIELD

The present document relates to a method and an apparatus for reducing and/or correcting a deviation from a target gradient of a magnetic field gradient created by a magnetic resonance system (MR system). The present document further relates to a method for creating a trained function. Finally, the present document relates to an MR system.

BACKGROUND

In magnetic resonance tomography, a number of magnetic fields are overlaid. In this way, a high background magnetic field is created, which field leads to the nuclei aligning themselves, because of the nuclear spin, along the background magnetic field. Further, with the aid of a gradient system, a magnetic field gradient is created, which defines the spatially-dependent magnetic resonant frequency (Larmor frequency). Furthermore, radio-frequency excitations are created, which align the nuclear spins of specific, resonantly excited nuclei with a flip angle relative to the background magnetic field. With already excited nuclear spins, these can be aligned in another angular position, and, in particular, be brought into an initial state parallel to the background magnetic field. In this process, referred to as relaxation, a radio-frequency radiation is created, which radiation is measured. What is known as the raw data is created by this.

The magnetic resonance radiation is recorded in the spatial frequency space (k-space). Finally, by evaluation of the raw data, image data of the object to be examined can be created.

During the measurement, predetermined pulse sequences can be specifically emitted, wherein this involves sequences of radio-frequency pulses and of magnetic field gradients.

The accuracy of the gradient system used has a great influence on the image quality. In particular, non-cartesian recordings, for example with radial or spiral-shaped trajectories or single-shot Echo Planar Imaging (EPI), make high demands in this case on the temporal accuracy of the magnetic field gradients.

For a number of reasons, however, deviations from a target gradient (nominal magnetic field gradient) of the created (emitted) magnetic field gradients can occur. Important influencing factors are factors such as eddy currents, timing and amplification imprecisions and also field fluctuations, which are caused by mechanical vibrations during switching of magnetic field gradients. Thermal fluctuations of the hardware components can further have an influence, such as of gradient coils, of the electronics of the gradient amplifier or the like. All these effects lead to deviations from the desired target gradient or to errors in the detected signal and ultimately to artifacts in the image.

When these deviations are known precisely the actual magnetic field gradient can be specified and used for image reconstruction. As an alternative, the magnetic field gradient actually emitted can be measured. The known behavior of the gradient system can however also be used for pre-compensation of possible deviations of the magnetic field gradients.

The behavior of the gradient system in this case is also dependent on temperature. The emission of a magnetic field gradient with a gradient coil leads to a heating up of the gradient system. This change in temperature in its turn influences the transmission behavior of the dynamic gradient system. Influences due to temperature and vibrations are described for example in Wu et al., "Gradient-induced acoustic and magnetic field fluctuations in a 4 T whole-body MR imager", Magn. Reson. Med 2000; 44:532-536, and also in Clayton et al., "1H Spectroscopy without Solvent Suppression: Characterization of Signal Modulations at Short Echo Times", J. Magn. Reson. 2001; 153:203-209, in Foerster et al., "Magnetic field shift due to mechanical vibration in functional magnetic resonance imaging", Magn. Reson. Med. 2005; 54:1261-1267, and in Jehenson et al., "Analytical method for the compensation of eddy-current effects induced by pulsed magnetic field gradients in NMR systems", J. Magn. Reson. 1990; 90:264-278.

Small field probes or a dynamic field camera can be used in order to measure the emitted magnetic field gradients that deviate from the target gradient, as described in Duyn et al., "Simple correction method for k-space trajectory deviations in MRI", J. Magn. Reson. 1998, 132, pages 150-153. The measured magnetic field gradient can then be used for the image reconstruction. In this case, the trajectory must be newly acquired for the reconstruction when specific sequence or image parameters change. This makes the use of this approach more difficult for a medical product in the everyday clinical routine.

The object of the present invention is therefore to improve the quality of image data acquired.

SUMMARY

This object is achieved by a method and an apparatus for reducing and/or correcting a deviation from a target gradient of a magnetic field gradient created by an MR system, by a method for creating a trained function and by an MR system.

Preferred forms of embodiment are disclosed herein.

In accordance with a first aspect, a method is provided for reducing and/or correcting a deviation from a target gradient of a magnetic field gradient created by an MR system. Input data for a trained function trained by a machine-learning algorithm is provided. The MR system includes an amplifier, which amplifies an amplifier input signal and outputs it as an amplifier output signal. The MR system includes a gradient coil, which creates the magnetic field gradient with the aid of the amplifier output signal. Input data is provided for a function trained by a machine-learning algorithm, wherein the input data includes information about the target gradient of the MR system. Output data is created by the trained function with the aid of the input data. The deviation from the target gradient of the magnetic field gradient created by the MR system is reduced and/or corrected. A deviation caused by the amplifier is reduced and/or corrected with the aid of the output data created, and a deviation caused by the gradient coil is reduced and/or corrected with the aid of the gradient characterization function.

In accordance with a second aspect, a computer-implemented method is provided for creation of a trained function. Training data is provided, which includes information about at least one target gradient of an MR system with associated magnetic field gradient actually created by the MR system. The MR system includes an amplifier, which amplifies an amplifier input signal and outputs it as an amplifier output signal, and includes a gradient coil, which creates the magnetic field gradient with the aid of the amplifier output signal. The function is trained by a machine-learning algorithm, based on the training data, wherein the function is trained to output output data, which is able to be used for reducing and/or correcting a deviation from the target gradient of magnetic field gradients created by the MR system, wherein the deviations are caused by the amplifier. The trained function is provided.

In accordance with a third aspect, an apparatus for reducing and/or correcting a deviation from a target gradient of a magnetic field gradient created by an MR system is provided. The MR system includes an amplifier, which amplifies an amplifier input signal and outputs it as an amplifier output signal, and includes a gradient coil, which creates the magnetic field gradient with the aid of the amplifier output signal. The apparatus includes a computing facility (computer), which is embodied to provide input data to a function trained by a machine-learning algorithm, wherein the input data includes information about the target gradient of the MR system. The computing facility is further embodied to create output data by the trained function with the aid of the input data and is further embodied to determine a gradient characterization function of the gradient coil. A reduction/correction facility (computer configuration) is embodied to reduce and/or to correct the deviations from the target gradient of the magnetic field gradient created by the MR system. The reduction/correction facility is embodied to reduce and/or to correct deviations caused by the amplifier with the aid of the output data corrected, and to reduce and/or to correct deviations caused by the gradient coil with the aid of the gradient characterization function.

In accordance with a fourth aspect, an MR system has an amplifier, which is embodied to amplify an amplifier input signal and to output it as an amplifier output signal. The MR system further includes a gradient coil, which is embodied, with the aid of the amplifier output signal, to create a magnetic field gradient and includes an apparatus in accordance with the third aspect, which is embodied to correct and/or to reduce deviations from a target gradient of the magnetic field gradient created by the gradient coil.

In accordance with a fifth aspect, a computer program product has executable program code, which is embodied, when executed on a control apparatus of the MR system in accordance with the fourth aspect, to carry out the method for reducing and/or correcting deviations from a target gradient of a magnetic field gradient created by the MR system in accordance with the first aspect or the method for creation of a trained function in accordance with the second aspect.

In accordance with a sixth aspect, a non-volatile, computer-readable memory medium stores executable program code, which is embodied, when executed on a control apparatus of the MR system in accordance with the fourth aspect, to carry out the method for reducing and/or correcting deviations of a magnetic field gradient created by the MR system from a target gradient in accordance with the first aspect or the method for creation of a trained function in accordance with the second aspect.

The reduction and/or correction of the deviations from the target gradient of the magnetic field gradient created by the MR system is undertaken by using a trained function (i.e., a trained algorithm). The trained function compensates in this case for at least some of the deviations that are caused by the amplifier. Due to the use of the trained function, the behavior of the amplifier can be assumed to be linear and time-invariant. The trained function is suitable or embodied in particular for dealing with or to compensate for non-linearities or imprecisions of the amplifier, which lead to deviations of the created magnetic field gradient from a target gradient. The linear deviation caused by the gradient coil is additionally corrected based on the gradient characterization function.

A simple and quick to carry out and/or precise method is provided for correction of noise effects. The trained function is preferably suitable for being applied to a patient during a magnetic resonance measurement, so that time-consuming and/or computing-intensive subsequent correction methods can be avoided.

A reduction or correction, which is able to be used in clinical routine, of a deviation from a target gradient of a magnetic field gradient created by an MR system is provided.

A target gradient is understood as a desired magnetic field gradient (nominal magnetic field gradient), which can differ from the actually emitted magnetic field gradient. The deviation of the target gradient from the magnetic field gradient emitted can be characterized in this case by a discrepancy or the difference between the target gradient and the magnetic field gradient emitted.

In a further form of the method for reducing and/or correcting a deviation from a target gradient of a magnetic field gradient created by an MR system, the gradient characterization function is computed using the magnetic field gradient created by the MR system and/or an amplifier output signal of the amplifier.

In a further form of the method for reducing and/or correcting a deviation from a target gradient of a magnetic field gradient created by an MR system, a corrected amplifier input signal or a correction signal for correction of the amplifier input signal is created with the aid of the gradient characterization function. The corrected amplifier input signal is applied to the amplifier. The gradient characterization function can thus be used for a pre-emphasis.

In a further form of the method for reducing and/or correcting a deviation from a target gradient of a magnetic field gradient created by an MR system, the MR system creates raw data by the created magnetic field gradient. MR image data is created with the aid of the raw data and the gradient characterization function. The gradient characterization function can thus be used for post-correction.

In a further form of the method for reducing and/or correcting a deviation from a target gradient of a magnetic field gradient created by an MR system, the raw data is created with the aid of the gradient characterization function in such a way that a deviation caused by the gradient coil is reduced and/or corrected. Thus, with the aid of the gradient characterization function, a post-correction is carried out.

In a further form of the method for reducing and/or correcting a deviation from a target gradient of a magnetic field gradient created by an MR system, the trained function determines a corrected amplifier input signal or a correction signal for correcting the amplifier output signal. The amplifier output signal is created as a function of the corrected amplifier input signal or of the correction signal. The trained function can thus create the amplifier input signal directly. As an alternative, a correction signal can be created, which can be combined with an amplifier input signal created by a control facility. To this end, the combination can be undertaken by at least one of factorization, subtraction, weighting and exponentiation. The electrical input signal can be adapted accordingly in this case.

By using the corrected amplifier input signal or the correction signal, a pre-emphasis can be carried out so that the deviations from the target gradient of the magnetic field gradient created by the MR system can be greatly reduced. In particular, in this way, imprecisions of the amplifier of the gradient system can be compensated for or corrected.

In a further form of the method for reducing and/or correcting a deviation from the target gradient of the magnetic field gradient created by the MR system, a corrected output signal of the amplifier is determined with the aid of the gradient characterization signal.

In a further form of the method for reducing and/or correcting a deviation from a target gradient of a magnetic field gradient created by an MR system, the amplifier input signal is adapted with the aid of the gradient characterization function. Separately or independently thereof, the deviation caused by the amplifier is reduced and/or corrected with the aid of the output data created. For example, the gradient characterization function is used in order to adapt the amplifier input signal after an adaptation has already been carried out as a function of the trained function. There is thus a two-stage adaptation of the amplifier input signal. The GSTF for the target gradient is already known in this case, similar to a Look-Up Table. The trained function is trained to correct the input signal for a desired target gradient. Both measures can act on the amplifier input signal or be employed for correction of the amplifier input signal, before the amplifier receives the input signal.

For the training of the function in clinical operation, a test gradient pulse can accordingly be emitted before the actual pulse sequence. The GSTF is preferably not employed in the test gradient pulse for adaptation of the amplifier input signal. In this way, the amplifier output signal can be measured and transferred as training data to the trained function.

As an alternative, the GSTF can be used for the post-correction of effects of the gradient coil.

In a further form of the method for reducing and/or correcting a deviation from a target gradient of the magnetic field gradient created by an MR system, the input data for the trained function includes the amplifier input signal. The input data can further, in addition or as an alternative, include the measured amplifier output signal. The input data can further, in addition or as an alternative, include an impedance, in particular an impedance spectrum, of the amplifier, the gradient coil and/or the gradient system. The input data can further, in addition or as an alternative, include a measured temperature of the amplifier and/or an ambient temperature. The input data can further, in addition or as an alternative, include at least one magnetic field gradient measured by the MR system. The input data can further, in addition or as an alternative, include an imaging region (Field of View). The input data can further, in addition or as an alternative, include information regarding an object examined by the MR system. This can in particular involve patient information, such as for example information about a diagnostically relevant region of the body, but also about a size, a weight and/or an age of a patient being examined. The body of the patient being examined can in this case have an influence on the emitted magnetic field gradients. This may result in distortions. Such influences can be trained into the trained function, so that it can compensate for these kinds of influences. Taking into account this additional input data enables the reduction and/or correction of the deviations to be improved once again.

In a further form of the method for reduction and/or correction of a deviation from a target gradient of a magnetic field gradient created by an MR system, the trained function is based on an artificial neural network. A neural network can in particular be a deep neural network, a convolutional neural network, or a convolutional deep neural network. Over and above this, a neural network can be an adversarial network, a deep adversarial network and/or a generative adversarial network.

In a further form of the method for reduction and/or correction of a deviation from a target gradient of a magnetic field gradient created by an MR system, the trained function is based on an auto encoder network consisting of a number of single-layer Boltzmann machine network stacks. The network can be subdivided into an encoder and a decoder network. For this application, the structure of the auto encoder network can be adapted to a multi-layer non-linear mapping network.

In a further form of the method for reduction and/or correction of a deviation from a target gradient of a magnetic field gradient created by an MR system, the trained function is based on a residual real-valued time-delay neural network (R2TDNN). Such networks have a particular focus on the learning of non-linear relationships, in particular for pre-emphasis of power amplifiers. As regards its architecture, this involves a simple MLP (Multi-Layer Perceptron). This network uses the real in-phase and quadrature components of the input signals and outputs the real and complex signal estimations at its output.

In a further form of the method for reduction and/or correction of a deviation from a target gradient of a magnetic field gradient created by an MR system, the trained function is based on an artificial neural network with radial base functions (RBFNN). This network is a simple Feed-Forward network with a hidden layer, in which the activation function is based on a Euclidian distance between the input vector and the weight vector. The output layer carries out a simple weighted sum with a linear output.

With the aid of the gradient characterization function a corrected amplifier input signal or a correction signal can be created for correcting the amplifier input signal, i.e., for the pre-emphasis described above. The pre-emphasis can be undertaken together with the trained function, for example by step-by-step adaptation of the amplifier input signal.

As an alternative, with the aid of raw data that is created by the MR system by the created magnetic field gradient, and with the aid of the gradient characterization function, MR image data can be created, i.e., for the post-correction described above.

In a further form of the computer-implemented method for creation of the trained function, a time characteristic of the target gradient includes at least one of a rectangular waveform, a trapezoidal waveform and a chirped pulse.

In a further form of the computer-implemented method for creation of the trained function, the training data, for each pair of target gradient and associated magnetic field gradient actually created by the MR system, further includes at least one of
 an amplifier input signal of the amplifier,
 the amplifier output signal of the amplifier,
 an impedance and/or an impedance spectrum of the amplifier, of the gradient coil and/or of the gradient system,
 a measured temperature of the amplifier,
 a measured magnetic field gradient created by the MR system,
 an imaging region (Field of View), and
 information regarding an object being examined by the MR system.

In a further form of the computer-implemented method for creation of the trained function, the trained function is based on an artificial neural network.

BRIEF DESCRIPTION OF THE DRAWINGS

The characteristics, features and advantages described above, as well as the manner in which these are achieved, will become clearer and easier to understand in conjunction with the description of the exemplary embodiments given below, which will be explained in greater detail in conjunction with the drawings, in which.

DETAILED DESCRIPTION OF THE FIGURES

Figure 1:
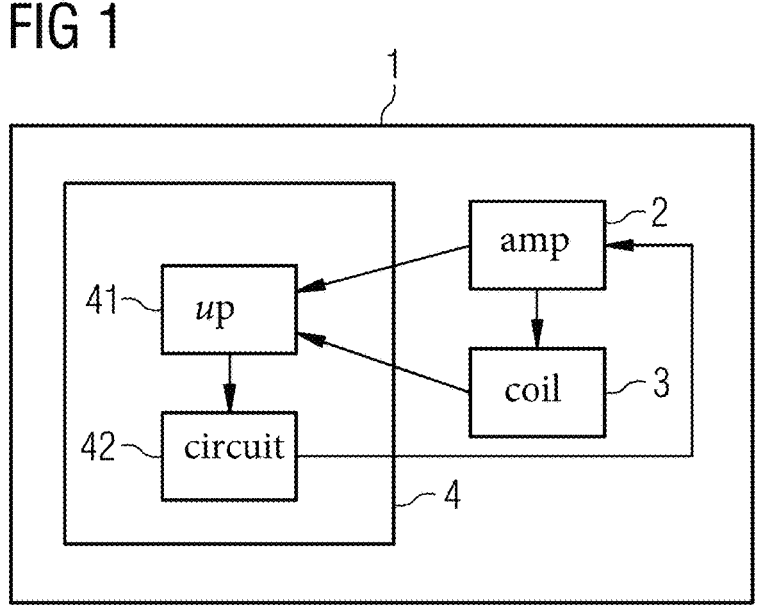
FIG. 1 shows a schematic block diagram of an MR system with an apparatus for reducing and/or correcting a deviation from a target gradient of a magnetic field gradient created by the MR system in accordance with one embodiment.

FIG. 1 shows a schematic block diagram of a magnetic resonance system 1 with an apparatus 4 for reducing and/or correcting a deviation from a target gradient of a magnetic field gradient created by the MR system 1.

The MR system 1 in this figure includes an amplifier 2, which amplifies an amplifier input signal and outputs it as an amplifier output signal. The MR system 1 further includes a gradient coil 3, which creates a magnetic field gradient with the aid of the amplifier output signal. In accordance with further embodiments, the MR system 1 can have a plurality of gradient coils 3.

The apparatus 4 includes a computing facility 41 (computer or processor). This is embodied to provide input data to a function trained by a machine-learning algorithm. The input data includes information about the target gradient of the MR system 1. The information about the target gradient can involve a time characteristic of the target gradient, a frequency of the target gradient, a pulse width of the target gradient and/or a slew rate of the target gradient. The designation of the target gradient can for example be a numerical value, a string (for example, a code name or acronym) or an identifier in any given data format.

The input data for the trained function can in particular include an amplifier input signal of the amplifier 2 and/or the measured amplifier output signal.

It is likewise possible to take temperature dependencies into account. To this end, the input data can include an ambient temperature of the MR system 1, but also a measured temperature of the amplifier 2 and/or of the gradient coil 3. Through this, the dependency on the temperature of the amplifier 2 or of the gradient coil 3 is learned as well.

The input data can further include an imaging region. The imaging region can in particular be characterized by a diagnostically relevant region of the body of a patient to be examined. The diagnostically relevant region of the body can for example predetermine or define a positioning of the patient relative to the MR system 1 during a magnetic resonance examination or a scan. The positioning of the patient relative to the MR system 1 can in its turn have an influence on the emitted magnetic field gradient (for example a distortion), which can be trained into the trained function. Information regarding an object being examined by the MR system 1 can likewise be part of the input data. This can in particular involve patient information, in particular size or weight of the patient.

The trained function creates output data with the aid of the input data. The computing facility 41 is further embodied to determine a gradient characterization function of the gradient coil 3.

The apparatus 4 further includes a reduction/correction facility 42 that reduces and/or corrects deviations from the target gradient of the magnetic field gradient created by the MR system 1. The reduction/correction facility 42 is embodied in this case to reduce and/or to correct deviations caused by the amplifier 2 with the aid of the output data created, and to reduce and/or to correct deviations caused by the gradient coil 3 with the aid of the gradient characterization function.

The apparatus 4 can include software and/or hardware components, such as central processing units (CPUs), graphics processing units (GPUs), microcontrollers, integrated circuits (ICs), Application-Specific Integrated Circuits (ASICs), Field Programmable Gate Arrays (FPGAs), Programmable Logic Circuits (PLDs), Digital Signal Processors (DSPs) or the like. Individual units of the apparatus 4, such as the computing facility 41 and the reduction/correction facility 42, can be designed as the same hardware component and/or software component or as separate hardware components and/or software components. At least parts of the computation can also be carried out on a remote server, i.e., such as in a Cloud.

In accordance with one embodiment, the trained function can determine a corrected amplifier input signal or a correction signal for correction of the amplifier input signal. The amplifier input signal can be created as a function of the corrected amplifier input signal or of the correction signal. The trained function can thus be used in a pre-emphasis scenario. This pre-emphasis can advantageously be employed for gradients, which are applied during a scan of a patient.

The reduction/correction facility 42 can be embodied to correct the amplifier input signal by a circuit, such as for example an ASIC, PLD, FPGA or DSP, or to transfer it to the amplifier 2.

Figure 2:
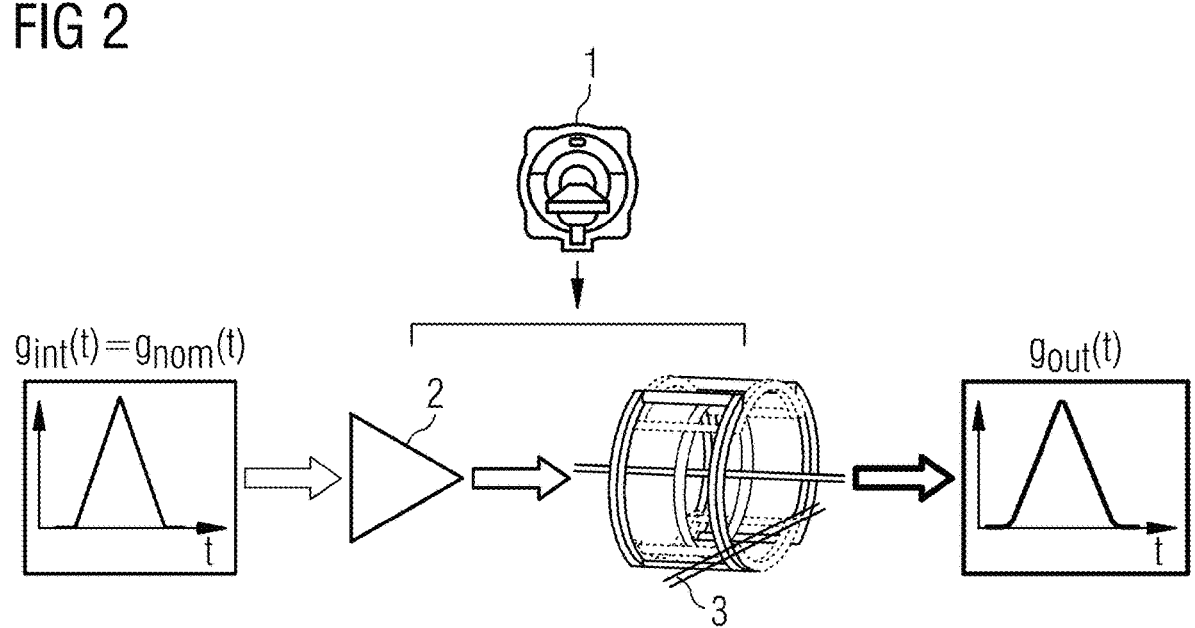
FIG. 2 shows a schematic view of an example MR system for explanation of the occurrence of the deviations from a target gradient of a magnetic field gradient created by the MR system.

FIG. 2 shows a schematic view of an MR system 1 for explanation of the occurrence of the deviations from a target gradient $g_{in}(t) = g_{nom}(t)$ of a magnetic field gradient $g_{out}(t)$ created by the MR system 1.

Figure 3:
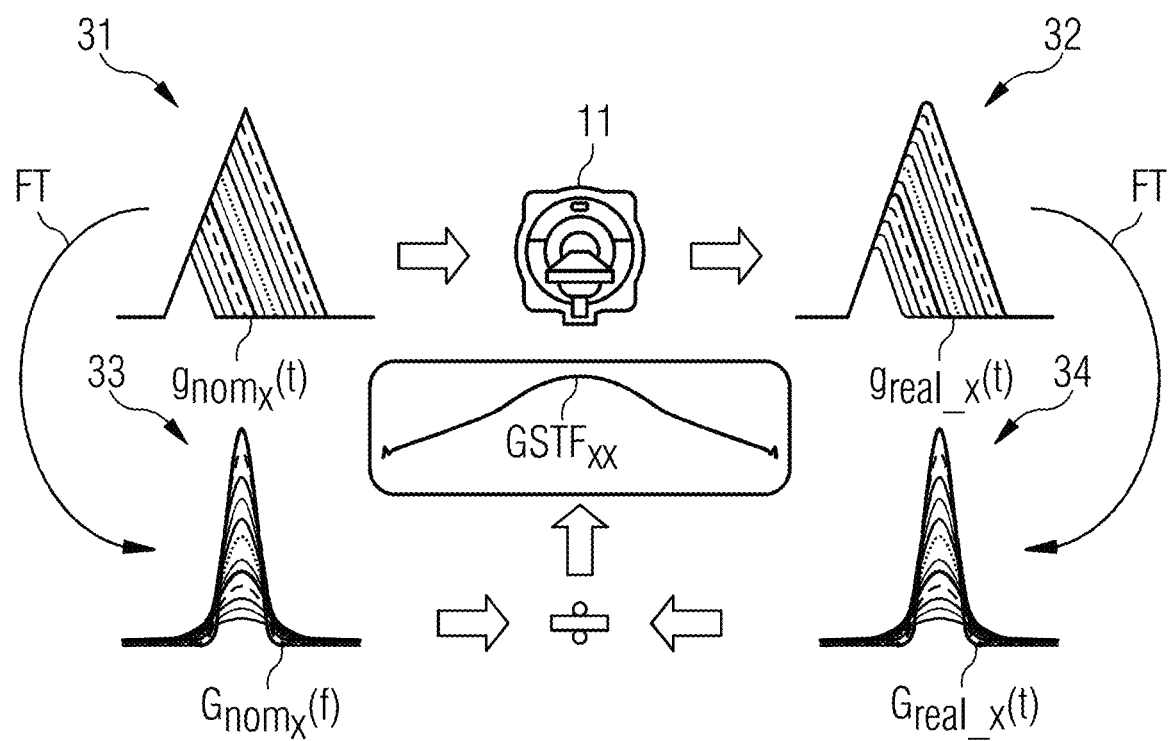
FIG. 3 shows an example schematic diagram for explanation of the computation of a gradient characterization function.

FIG. 3 shows a schematic diagram for explanation of the computation of a gradient characterization function. In this case, various time characteristics 31 of nominal gradients $g_{nom\_x}(t)$, i.e., of target gradient, as well as the associated time characteristics 32 of the gradient $g_{real\_x}(t)$ actually emitted are illustrated. The nominal gradient $g_{nom\_x}(t)$, which in FIG. 3, by way of example, has a triangular shape, is created in this case by a control facility of the MR system 1 and transferred to a scanner 11 of the MR system 1. The gradient $g_{real\_x}(t)$ actually emitted, because of noise effects, exhibits deviations from the triangular shape. In particular, the corners are slightly rounded by comparison with the nominal gradient $g_{nom\_x}(t)$.

Plotted in the lower part of FIG. 3 are the frequency spectra 33, 34 of the nominal gradient $G_{nom\_x}(f)$ obtained by a Fourier transform FT and also magnetic field gradient $G_{real\_x}(f)$ emitted. With the aid of the frequency spectra $G_{nom\_x}(f)$ and $G_{real\_x}(f)$, a gradient characterization function $GSTF_{xx}$ can be computed. This will be explained in greater detail below.

The gradient impulse response function (GIRF) or its Fourier transform, the gradient system transmission function (GSTF), are gradient characterization functions that fully describe the transmission characteristics of the MR system 1 and make possible the correction of distorted trajectories resulting from inadequacies of the gradient system. Mathematically the relationship between GIRF and GSTF can be described as follows:

$$\text{GIRF} = \text{FT}^{-1}\,\text{GSTF},$$

wherein $FT^{-1}$ refers to the inverse Fourier transform.

The MR imaging system is tested with test magnetic field gradients (i.e., test signals or input magnetic field gradients), for example rectangular pulses, triangular pulses, or chirped pulses. To this end an initial magnetic field gradient is measured for various test magnetic field gradients. This is undertaken by measurement of the output phase development in a specific measurement object, for example a phantom (in thin slice methods) or a dynamic field camera. The first order GSTF can be computed for example for the x-gradient axis (k=l=x) as the sum of the initial gradient:

$G_{out}^{i}(f)$ divided by the sum of the input gradients:

$$GSTF_{k,l}(f) = \left. \frac{\sum_{k=1}^{i=N} G_{in_k}^{*i}(f) \cdot G_{out_l}^{i}(f)}{\sum_{k=1}^{i=N} |G_{in_k}^{i}(f)|^2} \right.$$

$G_{nom}^{i}(f)$

This equation however does not apply exactly, due to the non-linear behavior of the amplifier 2. The non-linear influences are eliminated or at least reduced however by the correction of the deviation caused by the amplifier 2 with the aid of the output data created by the trained function.

There can be provision for referring back to previously determined GSTFs that have already been determined for specific gradient pulses, but also for temperatures. A Look-Up-Table can be used for this purpose. This means that a magnetic field camera is not necessary in medical operation.

This is advantageous, in particular in combination with the trained function, since this compensates for the non-linear or difficult-to-map behavior of then amplifier 2, which is poorly able to be described by GSTFs, while the GSTFs merely have to map the function of the gradient coils. This gives a higher accuracy by comparison with known methods, in which the GSTF is used for the entire gradient system.

Figure 4:
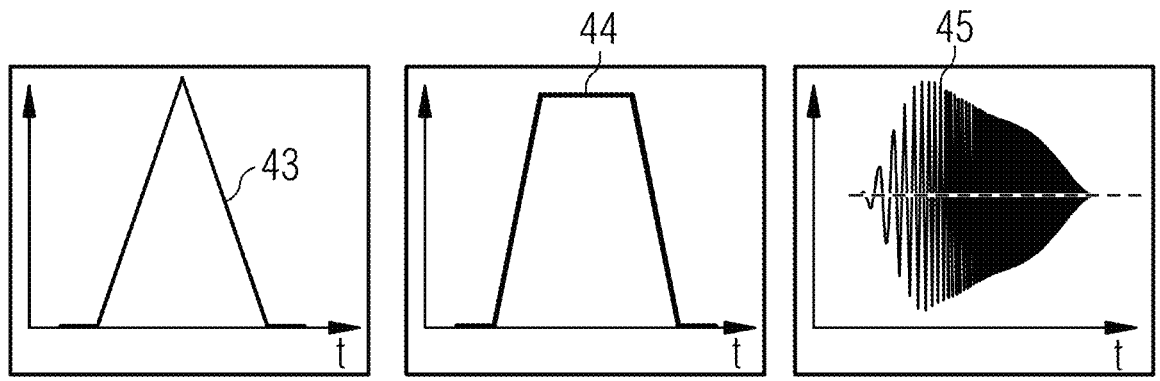
FIG. 4 shows examples of time characteristics of test pulses.

FIG. 4 shows examples of time characteristics of test pulses, which can be used for training the function. The test pulses in this case are magnetic field gradients, which can be used for training the trained function. The test pulses in this case can also be magnetic field gradients in regular medical operation.

Different sets of test pulses can serve to train a general representation of any given imaging pulses. Triangular pulses 43, rectangular pulses or trapezoidal pulses 44 and chirped pulses 45 can be used for these test pulses for example. In such cases, parameter sets can be varied, such as pulse width, amplitude, and slew rate. Preferably, a broad frequency spectrum (for example 0-100 kHz) with a high spectral intensity is covered. With this selection of test pulses, it can be ensured that the trained algorithm learns how the MR system 1 transmits the different frequency components from which all conventionally used imaging gradients are composed. Ideally, all possible frequencies that can be transmitted are tested. In a similar way, a library, which might be implemented as a Look-Up Table, can also be built for the GSTFs, to which there can then be recourse in medical operation.

In one embodiment, the training dataset contains many pairs of nominal and real emitted (distorted) gradients under various peripheral conditions.

Figure 5:
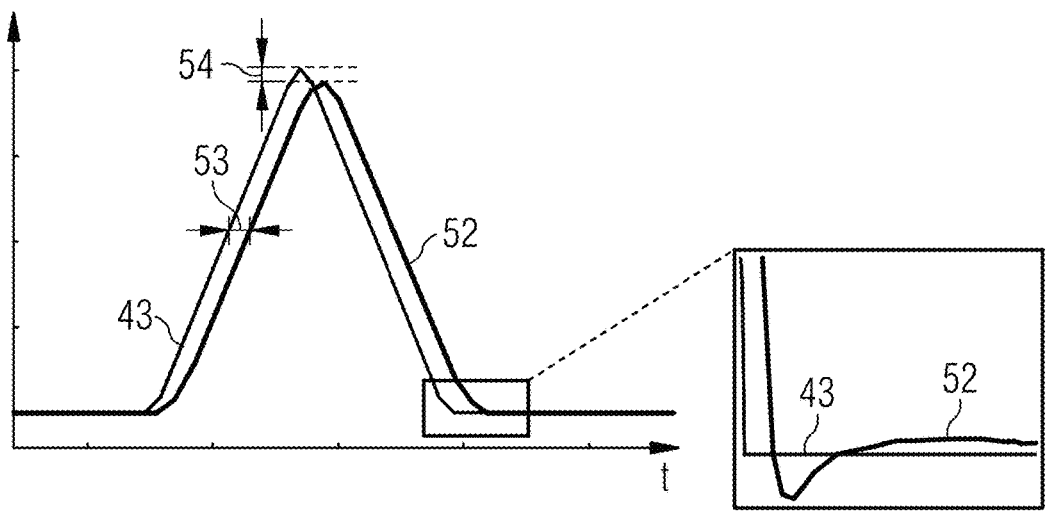
FIG. 5 shows an example of a deviation from the triangular waveform of the target gradient shown in FIG. 4 of a magnetic field gradient created by the MR system.

FIG. 5 shows an example of a deviation from the triangular-shaped waveform of the target gradient 43 also shown in FIG. 4 of a magnetic field gradient 52 created by an MR system 1. In this case, a signal transmission reduction 54 occurs. There is further a signal delay 53.

Figure 6:
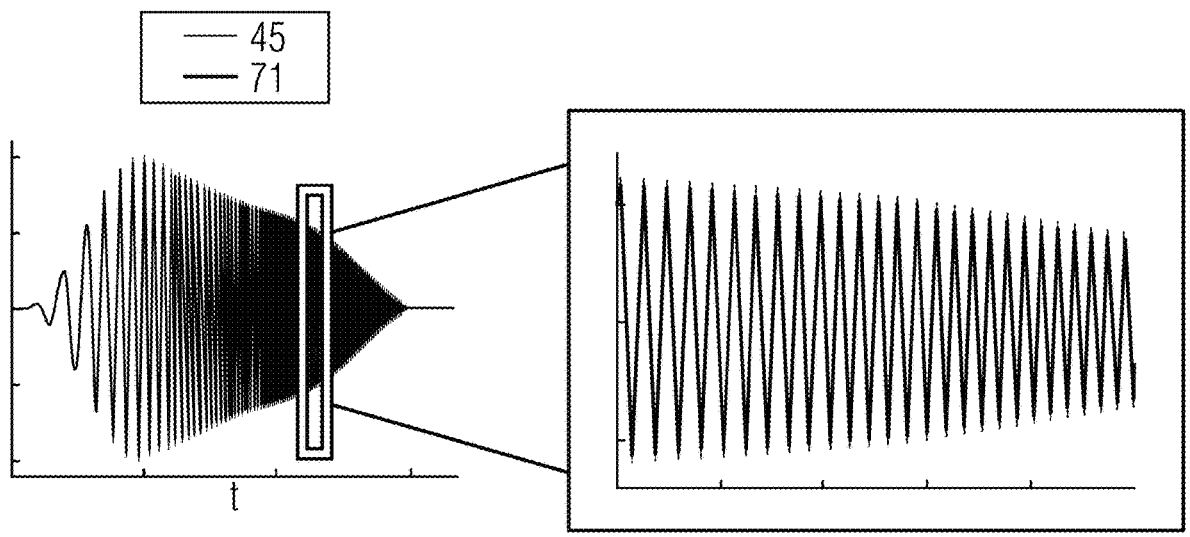
FIG. 6 shows an example of a deviation from the chirped pulse-like time characteristic of the target gradient shown in FIG. 4 of the magnetic field gradient created by an MR system.

FIG. 6 shows an example of a deviation from the chirped pulse-like time characteristic of the target gradient 45 shown in FIG. 4 of a magnetic field gradient 71 created by an MR system 1.

During the imaging, the amplifier 2 and the gradient coil 3 can heat up, in particular when longer working cycles and/or high slew rates are used. The temperature state of the amplifier 2 can be measured by various temperature sensors, which are integrated into the gradient system, in particular the amplifier 2. As an alternative, the temperature changes can also be modeled by a suitable model, such as for example a numerical model, an empirical model, an analytical model, and/or a compensation function. Preferably, the temperature states are incorporated into the training dataset, for example by emitting gradient pulses and/or pulse sequences for various temperature states.

In a few embodiments, the training data can also contain the amplifier input signal $i_{in}$, the amplifier output signal Lout, but also information about the imaging region or the imaging area and also information about the patients that are interfering with the magnetic gradient field of the emitted magnetic field gradients and thus introduce interference effects. There can further be provision for the trained function to have access to real time measured values (or computed values) of these parameters, in order to make possible a real time or an advance compensation for interference effects during an MR measurement of a patient.

Figure 7:
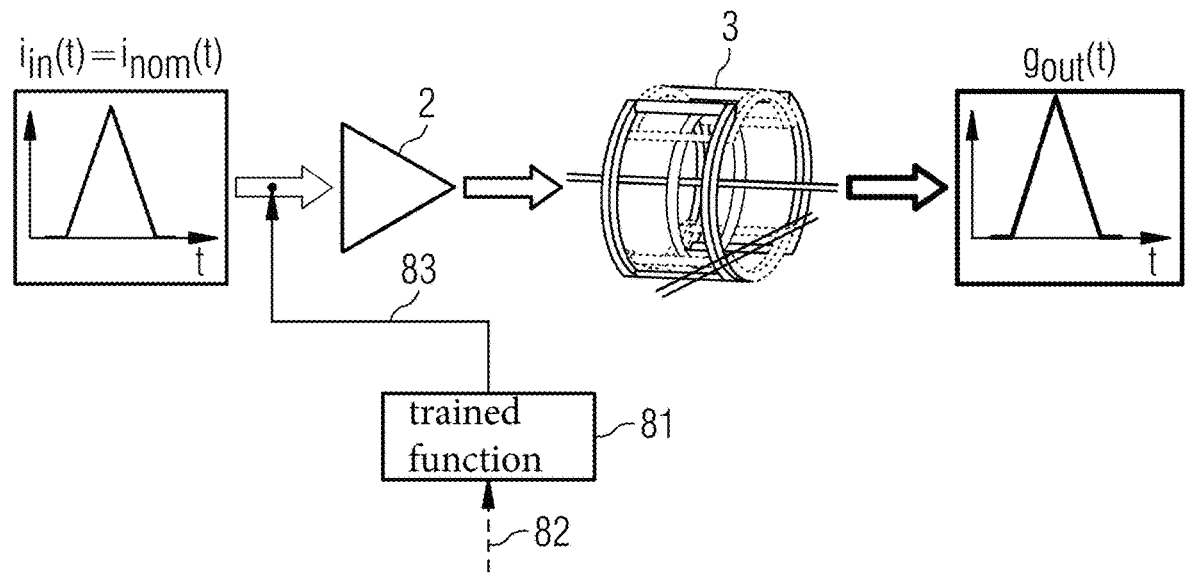
FIG. 7 shows a schematic block diagram for explanation of the use of a trained function for reducing and/or correcting a deviation from a target gradient of a magnetic field gradient created by an MR system in accordance with one embodiment.

FIG. 7 shows a schematic block diagram for explanation of the use of a trained function 81 for reducing and/or correcting a deviation from a target gradient of a magnetic field gradient created by an MR system 1. The trained function is configured so that it adjusts an input signal 83 to the amplifier 2 as a function of a target gradient $g_{nom}(t)$, which can be an input signal 82 of the trained function 81. The input signal 82 of the trained function 81 can also include a measured emitted magnetic field gradient. Such a configuration is already well suited to compensating for deviations from the target gradient of the created magnetic field gradient because of linear and non-linear influences of the amplifier 2. This applies in particular in cases in which temperature effects can be or have to be ignored, as is the case in the lowest-cost systems or with extremely fast gradient cycles or pulse sequences.

Figure 8:
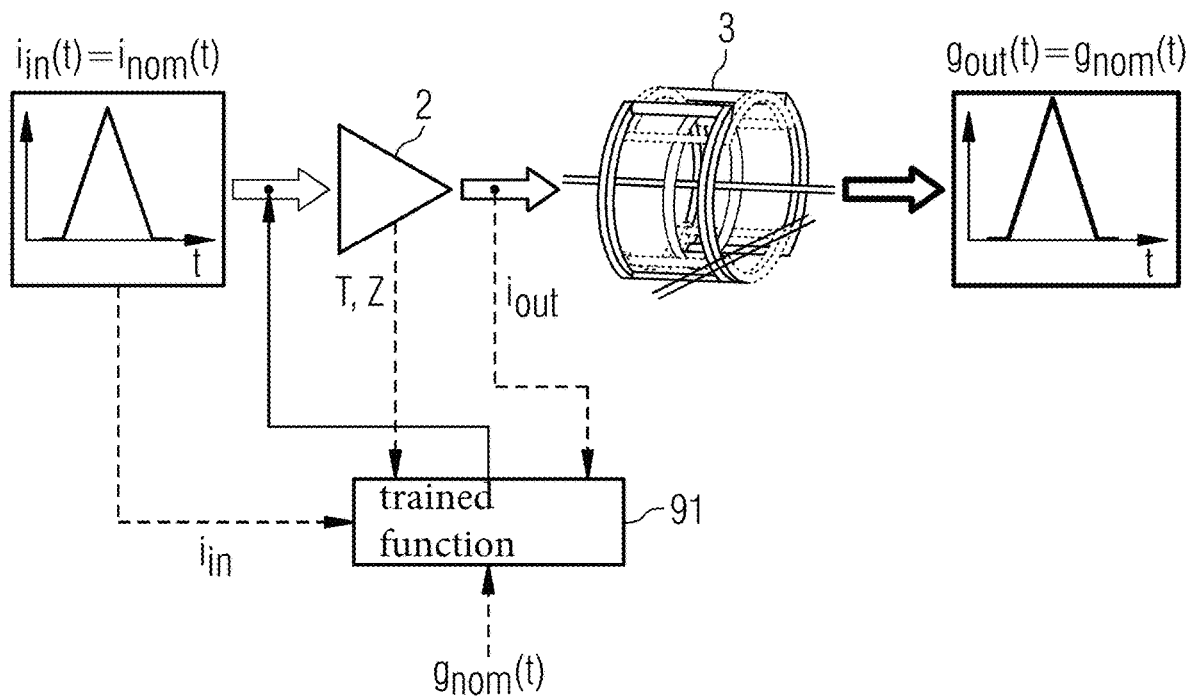
FIG. 8 shows a schematic block diagram for explanation of the use of a trained function for reducing and/or correcting a deviation from a target gradient of a magnetic field gradient created by an MR system in accordance with a further embodiment.

FIG. 8 shows a schematic block diagram for explanation of the use of a trained function 91 for reducing and/or correcting a deviation from a target gradient of a magnetic field gradient created by an MR system 1 in accordance with a further form of embodiment. In this figure, the trained function 91 is configured so that the trained function 91, in addition to the target gradient $g_{nom}(t)$, receives as its input the amplifier input signal $i_{in}$ in the amplifier 2 as a function of various parameters, for example a temperature T, an impedance Z and/or an impedance spectrum of the amplifier and patient information 92, such as dimensions or weight of the patient. The trained function 91 can further receive an amplifier output signal $i_{out}$ as input. The trained function creates a corrected amplifier input signal or a correction signal for correction of the amplifier input signal.

The amplifier input signal $i_{in}$ can be the signal that is applied directly to the amplifier 2. It is however just as conceivable for the amplifier input signal $i_{in}$ to represent a signal that would have been applied to the amplifier 2 but is transferred to the trained function instead. This can then output a corrected amplifier input signal $i_{in}$ to the amplifier 2. The provision of the amplifier input signal $i_{in}$ to the amplifier 2 shown by an arrow at the top left is thus to be seen as optional.

Figure 9:
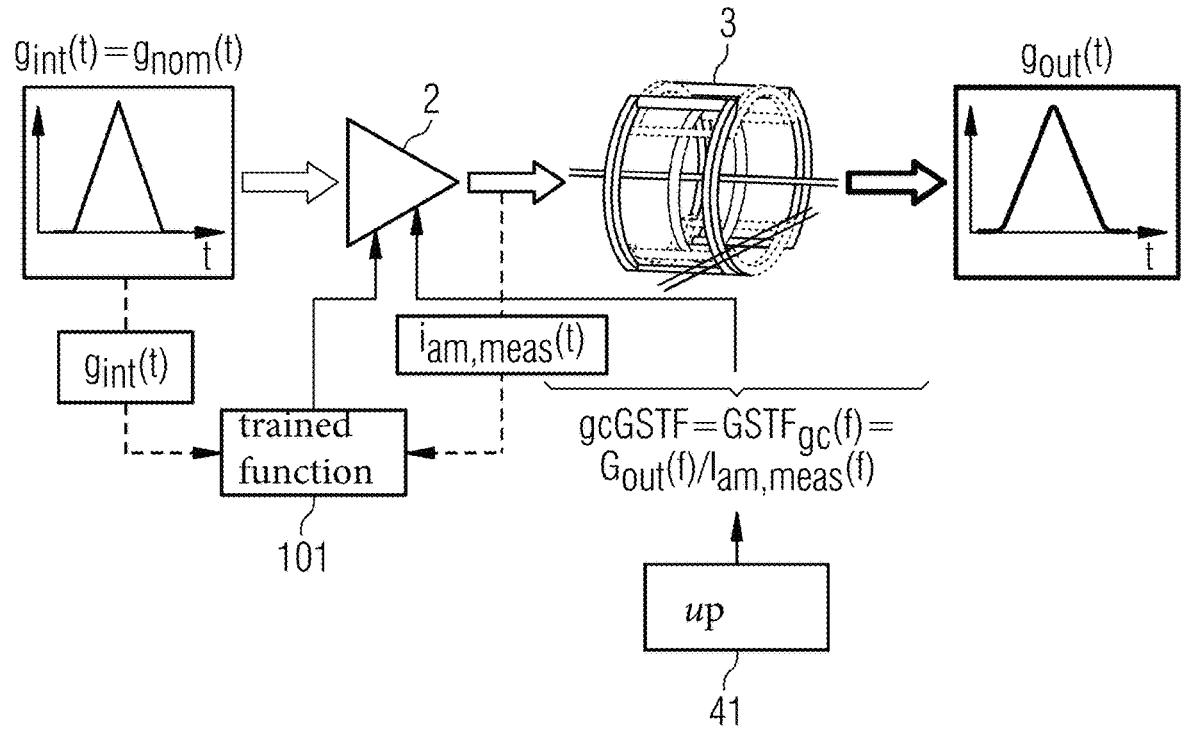
FIG. 9 shows a schematic block diagram for explanation of the use of a trained function for reduction and/or correction of a deviation from a target gradient of a magnetic field gradient created by an MR system in accordance with a further embodiment.

FIG. 9 shows a schematic block diagram to explain the use of a trained function 101 for reducing and/or correcting a deviation from a target gradient of a magnetic field gradient created by an MR system 1 in accordance with a further embodiment. The trained function receives as its input the target gradient $g_{in}(t)$ and the measured current at the amplifier output $i_{am,meas}(t)$. Both can be transferred by a computing facility 41 to the trained function. The gradient characterization function, i.e., for example the GSTF with regard to the gradient coil 3, which characterizes the frequency transmission of the gradient coil system, is computed on the basis of the frequency spectrum $G_{out}(f)$ of the emitted gradient and the frequency spectrum $I_{am,meas}(f)$ of the measured current $i_{am,meas}(t)$ by the computing facility 41, as explained above.

As explained above, the GSTF can originate from a Look-Up Table or be determined with the aid of a measurement by a field camera for acquiring the gradient pulse actually emitted.

Preferably, all distortion effects or imprecisions associated with the amplifier 2 are corrected or reduced via the trained function. The input current to the amplifier 21 can subsequently be adapted or pre-amplified as a function of the GSTF. It is however just as conceivable for the correction of the pre-amplifier input current with the aid of the GSTF to be undertaken before the adaptation of the amplifier input signal as a function of the trained function 101.

Figure 10:
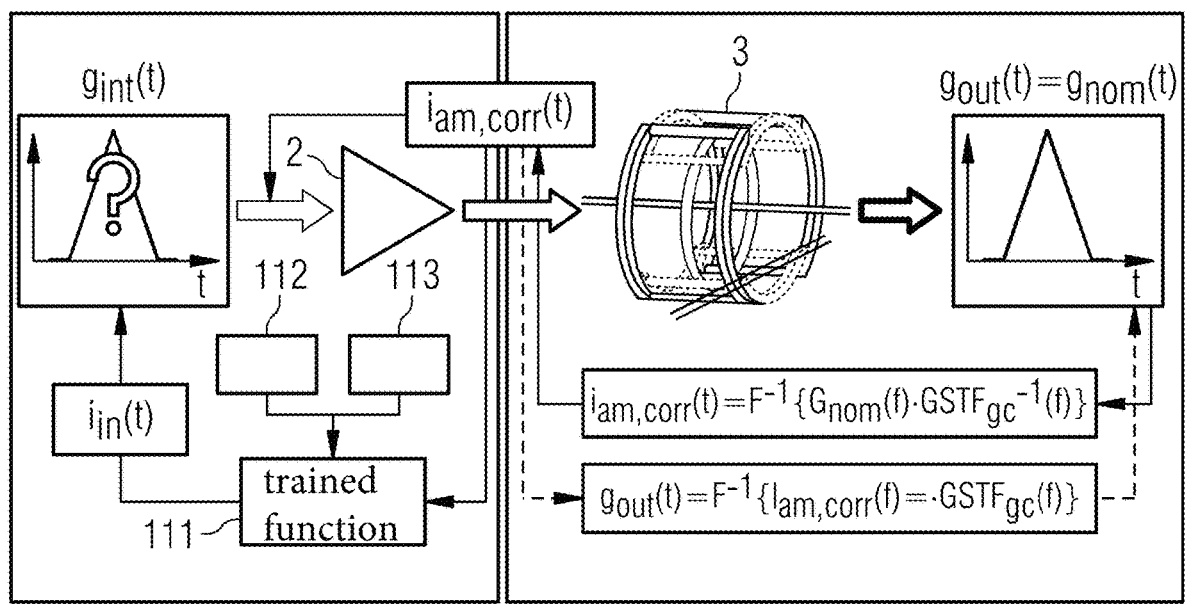
FIG. 10 shows a schematic block diagram for explanation of the use of a trained function for reduction and/or correction of a deviation from a target gradient of a magnetic field gradient created by an MR system in accordance with a further embodiment.

FIG. 10 shows a schematic block diagram to explain the use of a trained function for reducing and/or correcting a deviation from a target gradient of a magnetic field gradient created by an MR system 1 in accordance with a further embodiment.

After the gradient characterization function has been determined and thus a description of the distortion effects or imprecisions caused by the gradient coil 3 has been found, the magnetic field gradient $g_{in}(t)$ can be determined for pre-emphasis, in order to obtain a desired, nominal gradient output $g_{out}(t)$.

In the creation of Look-Up Tables for the GSTF, the imprecisions of the amplifier 2 can already be compensated for by the trained function. Then, in regular medical operation, there is preferably recourse to the Look-Up Tables of the GSTF, i.e., the GSTF can be employed for correction of the amplifier input signal although the gradient pulse has not yet been emitted.

So that the trained function can therefore continue to be trained in regular medical operation, an initial magnetic gradient can be emitted before the regular pulse sequence of the measurement, which is not corrected with the aid of the GSTF. This enables the trained function to learn the imprecisions of the amplifier 2 uninfluenced by the correction method by GSTF.

As an alternative, the acquired image data can also be corrected in respect of the imprecisions of the gradient coil 3 by a post-correction method. In this case, the amplifier input signal does not have to be adapted on the basis of the GSTF, but only by the trained function.

The step-by-step correction process can be divided into two steps.

In a first step, the trained function 111 is used in order to adapt or provide the input signal to the amplifier 2 and to compensate for distortion effects or imprecisions of the amplifier 2. Input data in this case can include the temperature 113 and/or further information 112 in accordance with a form of embodiment described above (for example an impedance, in particular an impedance spectrum of the amplifier 2).

Furthermore, the correction of distortion effects of the gradient coil 3 is undertaken in a second step. This can be carried out in different ways.

A first option is a pre-emphasis. To do this, the corrected output signal of the amplifier 2, i.e., the corrected amplifier output current $i_{am,corr}(t)$, is used in order to further adapt the input signal of the amplifier 2 that was provided by the trained function 111 or was already corrected by the trained function 111 and to correct or to reduce the distortion effects of the gradient coil 3.

In this embodiment, the gradient system with the gradient coil 3 can include a Digital Signal Processor (DSP), a Field Programmable Gate Array (FPGA) or a similar unit, which is configured so that it adapts the amplifier in real time when the gradient is emitted.

A second option is a post-correction. In this case, the gradient correction is carried out during the image reconstruction on the basis of the computed GSTF. The pre-emphasis thus only relates to the trained function and the compensating distortion effects or imprecisions of the amplifier 2.

Figure 11:
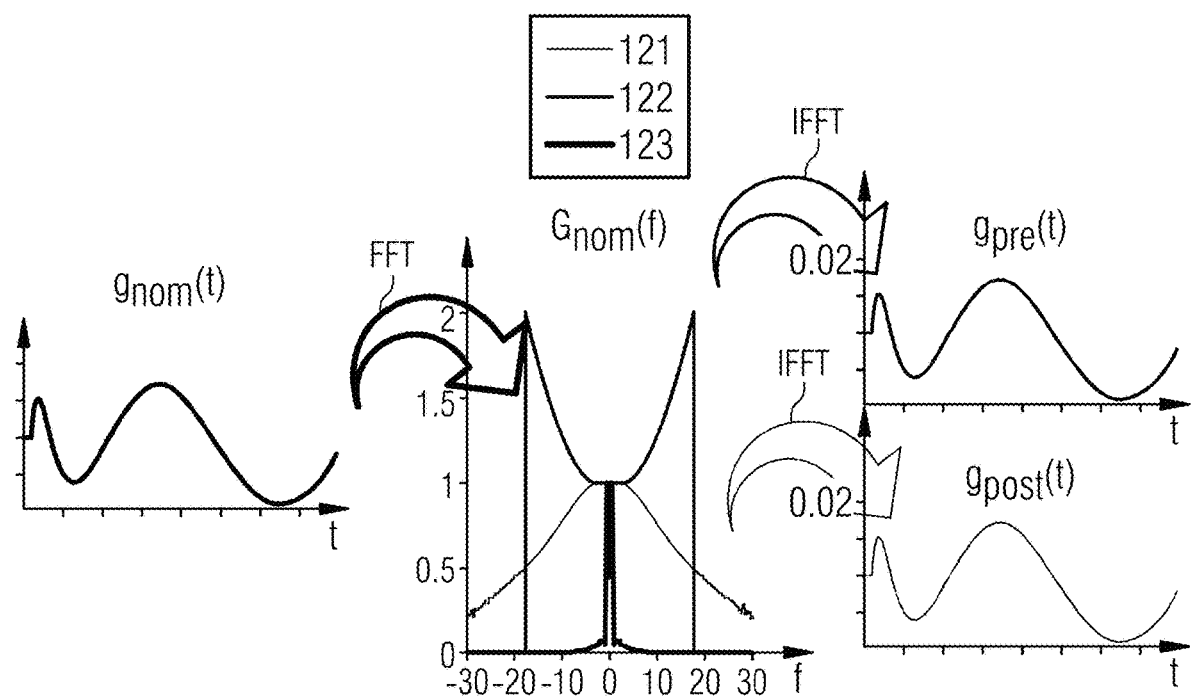
FIG. 11 shows examples of diagrams of the reduction and/or correction of a deviation from a target gradient of a magnetic field gradient created by an MR system for a specific time characteristic of the target gradient.

FIG. 11 shows examples of diagrams of the reduction and/or correction of a deviation from a target gradient of a magnetic field gradient created by an MR system for a specific time characteristic of the target gradient. The time characteristic here is spiral-shaped. The figure shows the target gradient $g_{nom}(t)$, the frequency representation 123 of the target gradient $G_{nom}(f)$ obtained by Fourier transform FFT and also the frequency representation 121 of the GSTF and the frequency representation 122 of the inverse GSTF.

In the post-correction, the frequency representation 123 of the target gradient $G_{nom}(f)$ is multiplied by the GSTF, before the result is transformed again into the time area. In the pre-emphasis the frequency representation 123 of the target gradient $G_{nom}(f)$ is multiplied by the frequency representation 122 of the inverse GSTF. The time characteristics $g_{pre}(t)$ and $g_{post}(t)$ obtained by the inverse FFT during pre-emphasis or post-correction are essentially identical.

Figure 12:
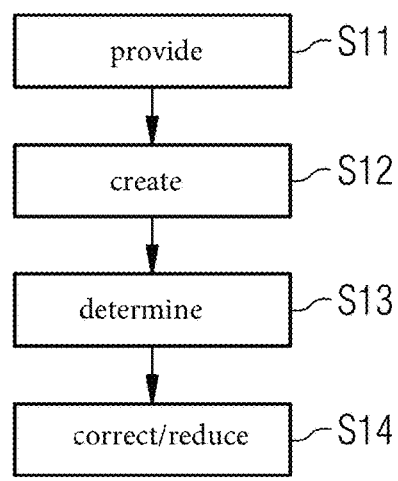
FIG. 12 shows a flow diagram of a method for reduction and/or correction of a deviation from a target gradient of a magnetic field gradient created by an MR system in accordance with one embodiment.

FIG. 12 shows a flow diagram of a method for reducing and/or correcting a deviation from a target gradient of a magnetic field gradient created by an MR system. The method can in particular be carried out with the apparatus 4 described in FIG. 1.

In this figure, in an act S11, input data is provided for a trained function provided by a machine-learning algorithm. The input data includes information about the target gradient of the MR system 1. The information about the target gradient can in particular involve a designation of the target gradient (for example a numerical value, string or an identifier in any given data format), the amplifier input signal or amplifier output signal or the like. It is likewise conceivable for the information about the target gradient to include a time characteristic of the target gradient, a frequency of the target gradient, a pulse width of the target gradient and/or a slew rate of the target gradient.

Preferably, the trained function (the trained algorithm) includes a neural network, for example a multilayer neural network ("deep learning") or a convolutional neural network. Various techniques, for example supervised learning, unsupervised learning or reinforced learning, can be employed for the training of the trained algorithm. Over and above this an approach based on Delta rules, a backpropagation algorithm or a Stochastic Gradient Descent (SGD) method can be used, for example for computation of the magnetic field gradients of loss functions with regard to the weights of the network.

In a second act S12, output data is created by the trained function with the aid of the input data.

In a third act S13, a gradient characterization function of the gradient coil 3 is determined.

In a fourth act S14, deviations from the target gradient of the magnetic field gradients created by the MR system caused by the amplifier 2 are corrected and/or reduced with the aid of the output data created. Furthermore, deviations caused by the gradient coil 3 are reduced and/or corrected with the aid of the gradient characterization function.

Figure 13:
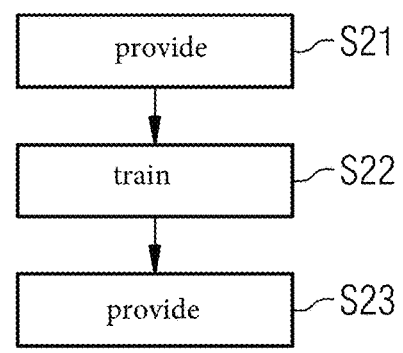
FIG. 13 shows a flow diagram of a computer-implemented method for creation of a trained function in accordance with one embodiment.

FIG. 13 shows a flow diagram of a computer-implemented method for creation of a trained function.

In a first act S21, training data is provided, which includes information about a target gradient of an MR system 1 with associated magnetic field gradient actually created by the MR system 1.

The MR system 1 includes an amplifier 2, which amplifies an amplifier input signal and outputs it as an amplifier output signal. The MR system 1 further includes a gradient coil 3, which creates the magnetic field gradient with the aid of the amplifier output signal. The MR system 1 can in particular be designed as described in FIG. 1.

The training data can include for a pair consisting of a target gradient and an associated magnetic field gradient actually created by the MR system 1, at least one of the signals or data that has been described in conjunction with FIG. 1 as input data of the trained function. Through this, the respective dependencies are trained as well. The trained function is then in a position to take these dependencies into account.

In a second act S22, the function is trained by a machine-learning algorithm. In this case, the training data is included. The function is trained to output output data, which is able to be used for reducing and/or correcting a deviation from the target gradient by magnetic field gradients created by the MR system 1, wherein the deviation is caused by the amplifier 2.

In accordance with one embodiment, the function is trained by offline training. In the offline training of the function, various training gradient pulses can be used. This can be carried out for example before the system is delivered to a customer and/or at specific times, for example during maintenance of the MR system or when no scans are planned. In this case a few recorded gradient pulses can be used for the training, which are to be used during the clinical routine. Above and beyond this any given gradient pulses can of course be used as training gradient pulses.

In accordance with one embodiment, the function is trained by online training during clinical operation, in particular during measurements of patients. An online training or continuous training in clinical operation can be realized by the gradient pulses being emitted shortly before the image sequence for image data acquisition in everyday clinical operation. Preferably, the emitted gradient pulse is acquired within seconds or milliseconds before the beginning of the actual imaging sequence. For this, a dedicated gradient pulse can also be generated, which does not have to belong to the pulse sequence of the clinical measurement. By an initial magnetic gradient being emitted before the regular pulse sequence of the measurement, which is not corrected with the aid of the GSTF, the trained function can learn the imprecisions of the amplifier 2 uninfluenced by the correction method by GSTF.

The acquired data can then be used for the online training, and time-dependent processes can be taken into account dynamically. This approach has the advantage that the trained function can be trained continuously or in clinical operation. Thus, temporal effects, e.g., aging processes of hardware components over time, can continuously be taken into account.

In accordance with one embodiment, the gradient characterization function is determined in such a way that MR image data can be determined with the aid of raw data, which is created by the MR system by the magnetic field gradient created, and with the aid of the gradient characterization function, i.e., for post correction.

The training data can include information about the target gradient of the MR system 1 and associated magnetic field gradient actually created by the MR system 1 for a plurality of different temperatures of at least one component of the MR system 1, different frequencies, different pulse widths, different amplitudes and/or different slew rates.

In a further act S23, the trained function is provided.

Figure 14:
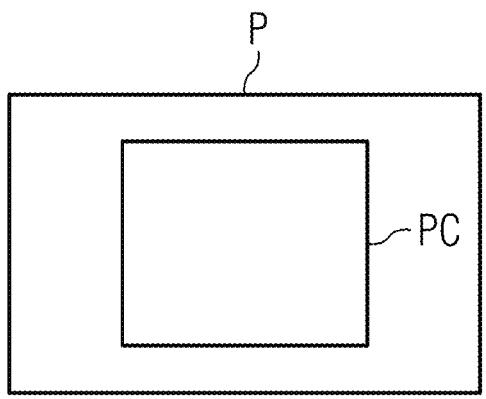
FIG. 14 shows a schematic block diagram of a computer program product in accordance with one embodiment.

FIG. 14 shows a schematic block diagram of a computer program product P with executable program code PC. The executable program code PC is embodied, when executed on a computer, to carry out one of the methods described above.

Figure 15:
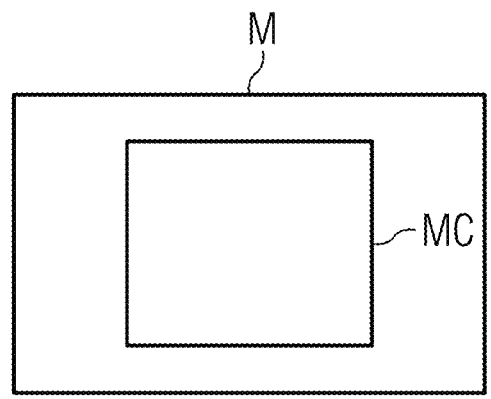
FIG. 15 shows a schematic block diagram of a non-volatile, computer-readable memory medium in accordance with one embodiment.

FIG. 15 shows a schematic block diagram of a non-volatile, computer-readable memory medium M with stored executable program code MC, embodied, when executed on a computer, to carry out one of the methods described above.

Although the invention has been illustrated and described in greater detail by the preferred exemplary embodiments, the invention is not restricted by the disclosed examples and other variations can be derived herefrom by the person skilled in the art without departing from the scope of protection of the invention.

The invention claimed is:

1. A method for reducing and/or correcting a deviation from a target gradient of a magnetic field gradient created by a magnetic resonance system (MR system), wherein the MR system comprises an amplifier, which amplifies an amplifier input signal and outputs an amplifier output signal, wherein the MR system comprises a gradient coil, which creates the magnetic field gradient with the aid of the amplifier output signal, wherein the method comprises:
    providing input data for a function trained by a machine-learning algorithm, wherein the input data comprises information about the target gradient of the MR system;
    creating output data by the trained function with the aid of the input data;
    determining a gradient characterization function of the gradient coil; and
    reducing and/or correcting the deviation from the target gradient of the magnetic field gradient created by the MR system, wherein a deviation caused by the amplifier is reduced and/or corrected by the output data, and wherein a deviation caused by the gradient coil is reduced and/or corrected with the aid of the gradient characterization function.

2. The method as claimed in claim 1, wherein the gradient characterization function is determined using the magnetic field gradient created by the MR system and/or the amplifier output signal of the amplifier.

3. The method as claimed in claim 1, wherein, with the aid of the gradient characterization function, a corrected amplifier input signal or a correction signal for correcting the amplifier input signal is created; and
    wherein the corrected amplifier input signal is applied to the amplifier.

4. The method as claimed in claim 1, wherein the MR system creates raw data by the magnetic field gradient; and
    wherein MR image data is created with the aid of the raw data and the gradient characterization function.

5. The method as claimed in claim 1, wherein the trained function determines a corrected amplifier input signal or a correction signal for correcting the amplifier input signal.

6. The method as claimed in claim 1, wherein the amplifier input signal is adapted with the aid of the gradient characterization function, and, independently thereof, a deviation caused by the amplifier is reduced and/or corrected with the output data.

7. The method as claimed in claim 1, wherein the input data for the trained function further comprises at least one of:
    the amplifier input signal,
    the amplifier output signal,
    an impedance or an impedance spectrum of the amplifier or of the gradient system,
    a temperature of the amplifier,
    a measured magnetic field gradient created by the MR system,
    an imaging region, and/or
    information regarding the object being examined by the MR system.

8. The method as claimed in claim 1, wherein the trained function is based on an artificial neural network.

9. The method as claimed in claim 2, wherein, with the aid of the gradient characterization function, a corrected amplifier input signal or a correction signal for correcting the amplifier input signal is created; and
    wherein the corrected amplifier input signal is applied to the amplifier.

10. The method as claimed in claim 9, wherein the MR system creates raw data by the magnetic field gradient; and
    wherein MR image data is created with the aid of the raw data and the gradient characterization function.

11. The method as claimed in claim 10, wherein the trained function determines a corrected amplifier input signal or a correction signal for correcting the amplifier input signal.

12. The method as claimed in claim 11, wherein the amplifier input signal is adapted with the aid of the gradient characterization function, and, independently thereof, a deviation caused by the amplifier is reduced and/or corrected with the output data.

13. A computer-implemented method for creation of a trained function, the computer-implemented method comprising:
    providing training data comprising an item of information about a target gradient of a magnetic resonance system (MR system), with associated magnetic field gradient actually created by the MR system, wherein the MR system comprises an amplifier, which amplifies an amplifier input signal and outputs an amplifier output signal, and wherein the MR system comprises a gradient coil, which creates the magnetic field gradient with the aid of the amplifier output signal;
    training the function by a machine-learning algorithm based on the training data, wherein the function is trained to output output data, which represents reducing and/or correcting a deviation from the target gradient of magnetic field gradients created by the MR system, wherein the deviations are caused by the amplifier; and
    providing the trained function.

14. The computer-implemented method as claimed in claim 13, wherein the trained function is created during the operation of the MR system, wherein a test magnetic field gradient is emitted for the training of the function before a magnetic field gradient used for examination of an object is emitted.

15. The computer-implemented method as claimed in claim 13, wherein the training data, for each pair of target gradient and associated magnetic field gradient actually created by the MR system, further comprises at least one of:
    the amplifier input signal, the amplifier output signal, an impedance or an impedance spectrum of the amplifier or of the gradient system, a temperature of the amplifier, a measured magnetic field gradient created by the MR system, an imaging region, and/or information regarding the object being examined by the MR system.

16. An apparatus for reducing and/or correcting a deviation from a target gradient of a magnetic field gradient created by a magnetic resonance system (MR system), wherein the MR system comprises an amplifier, which amplifies an amplifier input signal and outputs an amplifier output signal, and wherein the MR system comprises a gradient coil, which creates the magnetic field gradient with the aid the amplifier output signal, wherein the apparatus comprises:

a computer configured to provide input data to a trained function trained by a machine-learning algorithm, wherein the input data comprises information about the target gradient of the MR system, wherein the computer is further configured to create output data by the trained function with the aid of the input data, and wherein the computer is further configured to determine a gradient characterization function of the gradient coil; and a reduction and/or correction circuit configured to reduce and/or to correct deviations from the target gradient of the magnetic field gradient created by the MR system, wherein the reduction/correction circuit is configured to reduce and/or to correct deviations caused by the amplifier by the output data, and to reduce and/or to correct deviations caused by the gradient coil with the aid of the gradient characterization function.

17. The apparatus as claimed in claim 16, wherein the trained function is created during the operation of the MR system, wherein a test magnetic field gradient is emitted for the training of the function before a magnetic field gradient used for examination of an object is emitted.

18. The apparatus as claimed in claim 16, wherein the training data, for each pair of target gradient and associated magnetic field gradient actually created by the MR system, further comprises at least one of:

the amplifier input signal, the amplifier output signal, an impedance or an impedance spectrum of the amplifier or of the gradient system, a temperature of the amplifier, a measured magnetic field gradient created by the MR system, an imaging region, and/or information regarding the object being examined by the MR system.

* * * * *